(12) United States Patent
Li

(10) Patent No.: US 6,873,741 B2
(45) Date of Patent: Mar. 29, 2005

(54) NONLINEAR EDGE-ENHANCEMENT FILTER

(75) Inventor: Xin Li, Vancouver, WA (US)

(73) Assignee: Sharp Laboratories of America, Camas, WA (US)

(*) Notice: Subject to any disclaimer, the term of this patent is extended or adjusted under 35 U.S.C. 154(b) by 616 days.

(21) Appl. No.: 10/043,759

(22) Filed: Jan. 10, 2002

(65) Prior Publication Data

US 2003/0128888 A1 Jul. 10, 2003

(51) Int. Cl.$^7$ ................................................ G06K 9/40
(52) U.S. Cl. .................. 382/266; 382/252; 382/260; 382/269; 358/3.26; 358/3.27; 358/4.63
(58) Field of Search ............................... 382/252, 260, 382/263, 266, 269, 274, 275; 358/3.26, 3.27, 520, 463

(56) References Cited

U.S. PATENT DOCUMENTS

| | | | |
|---|---|---|---|
| 5,644,513 A | | 7/1997 | Rudin et al. |
| 5,757,979 A | * | 5/1998 | Hongo et al. ............... 382/276 |
| 5,787,208 A | | 7/1998 | Oh et al. |
| 5,790,692 A | * | 8/1998 | Price et al. .................. 382/133 |
| 5,819,035 A | | 10/1998 | Devaney et al. |
| 5,937,090 A | | 8/1999 | Kim |
| 6,028,646 A | | 2/2000 | Jeong et al. |
| 6,362,579 B1 | * | 3/2002 | Heizmann et al. .......... 315/370 |
| 6,774,943 B1 | * | 8/2004 | Kao et al. .................... 348/252 |

OTHER PUBLICATIONS

Ilya Pollak, Alan S. Willsky, and Hamid Krim, "Image Segmentation and Edge Enhancement with Stabilized Inverse Diffusion Equations", IEEE Transactions on Image Processing, vol. XX, No. Y, 1999, pp 1–12.

Stanley Osher and Leonid I. Rudin, "Feature–Oriented Image Enhancement Using Shock Filters", Siam Journal of Numerical Analysis, vol. 27, No. 4, Aug. 1990, pp 919–940.

Pietro Perona and Jitendra Malik, "Scale–Space and Edge Detection Using Anisotropic Diffusion", IEEE Transactions on Pattern Analysis and Machine Intelligence, vol. 12, No. 7, Jul. 1990, pp 629–639.

Giovanni Ramponi and Andrea Polesel, "A Rational Unsharp Masking Technique", Journal of Electronic Imaging, vol. 7, No. 2, Apr. 1998, pp 333–338.

* cited by examiner

*Primary Examiner*—Kanjibhai Patel
*Assistant Examiner*—Yosef Kassa
(74) *Attorney, Agent, or Firm*—Marger Johnson & McCollom P.C.

(57) ABSTRACT

Methods and apparatus for digital data array edge enhancement are disclosed. A local data window containing a data sample s is selected. Minimum and maximum sample values, max and min, are located within the window, and an edge deflection value ed is defined to have a value between max and min. A diffusion quantity is then calculated to move the value of s towards max, if s is greater than ed, or towards min, if s is smaller than ed. This approach has advantages over gradient-based edge-enhancement, including simplicity, convergence speed, and stability.

19 Claims, 11 Drawing Sheets

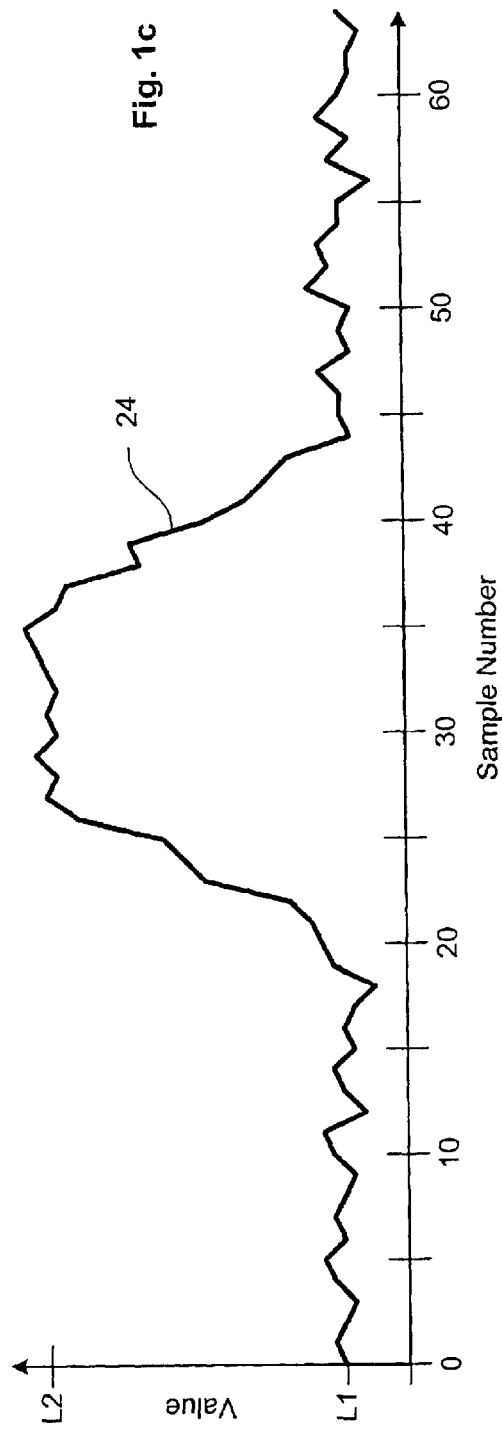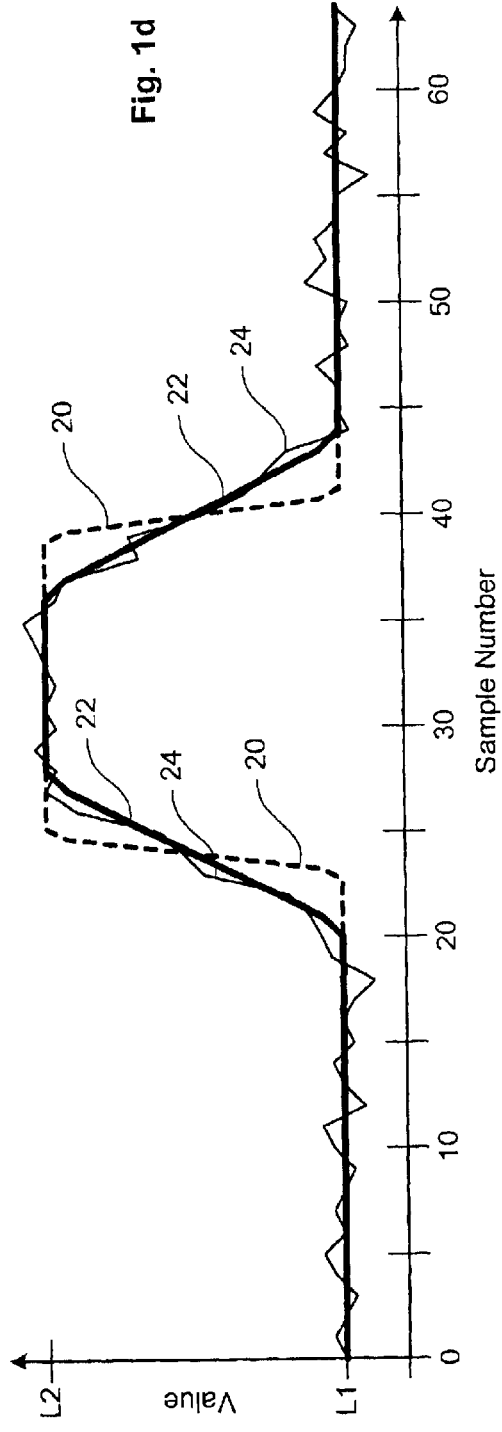

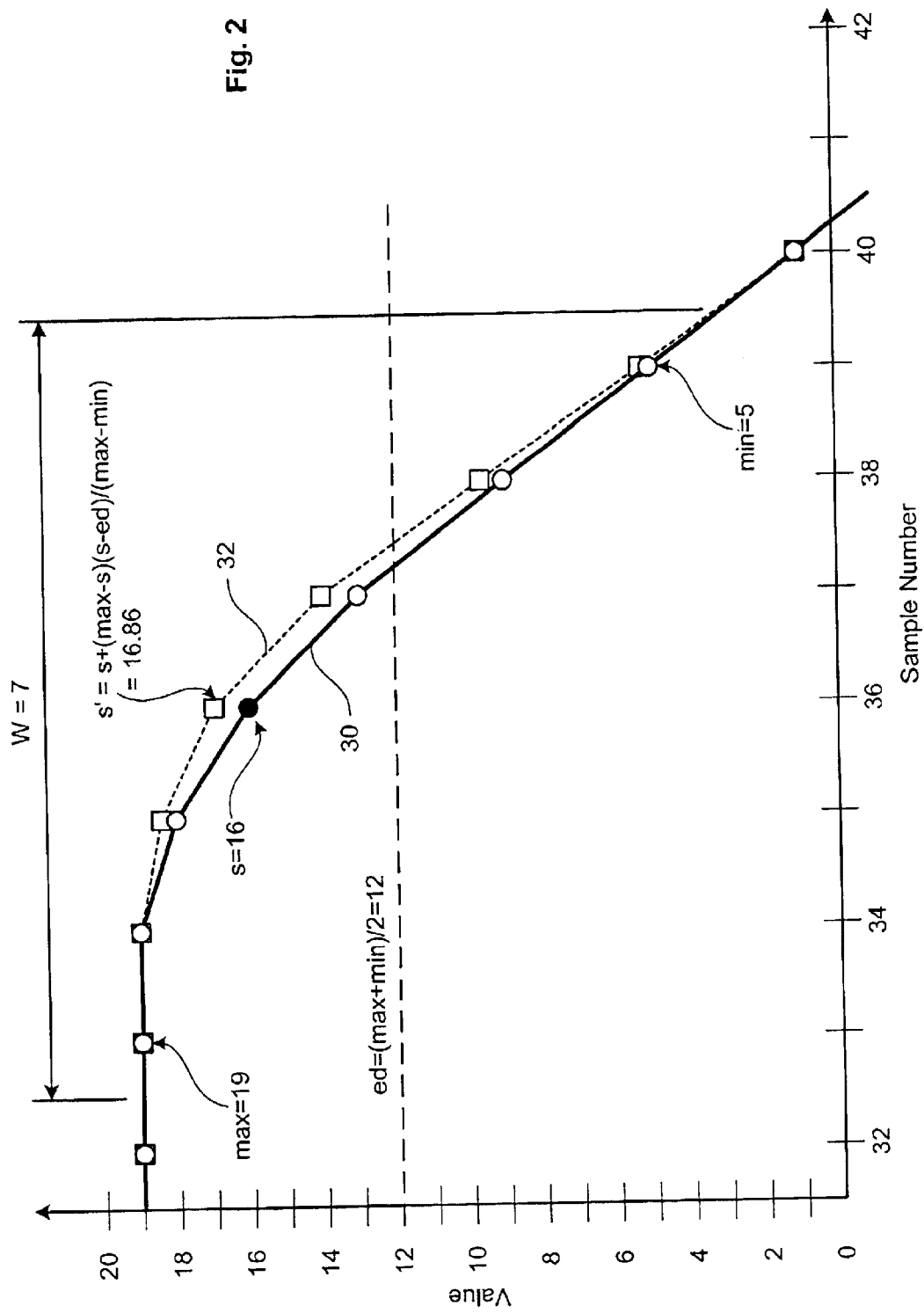

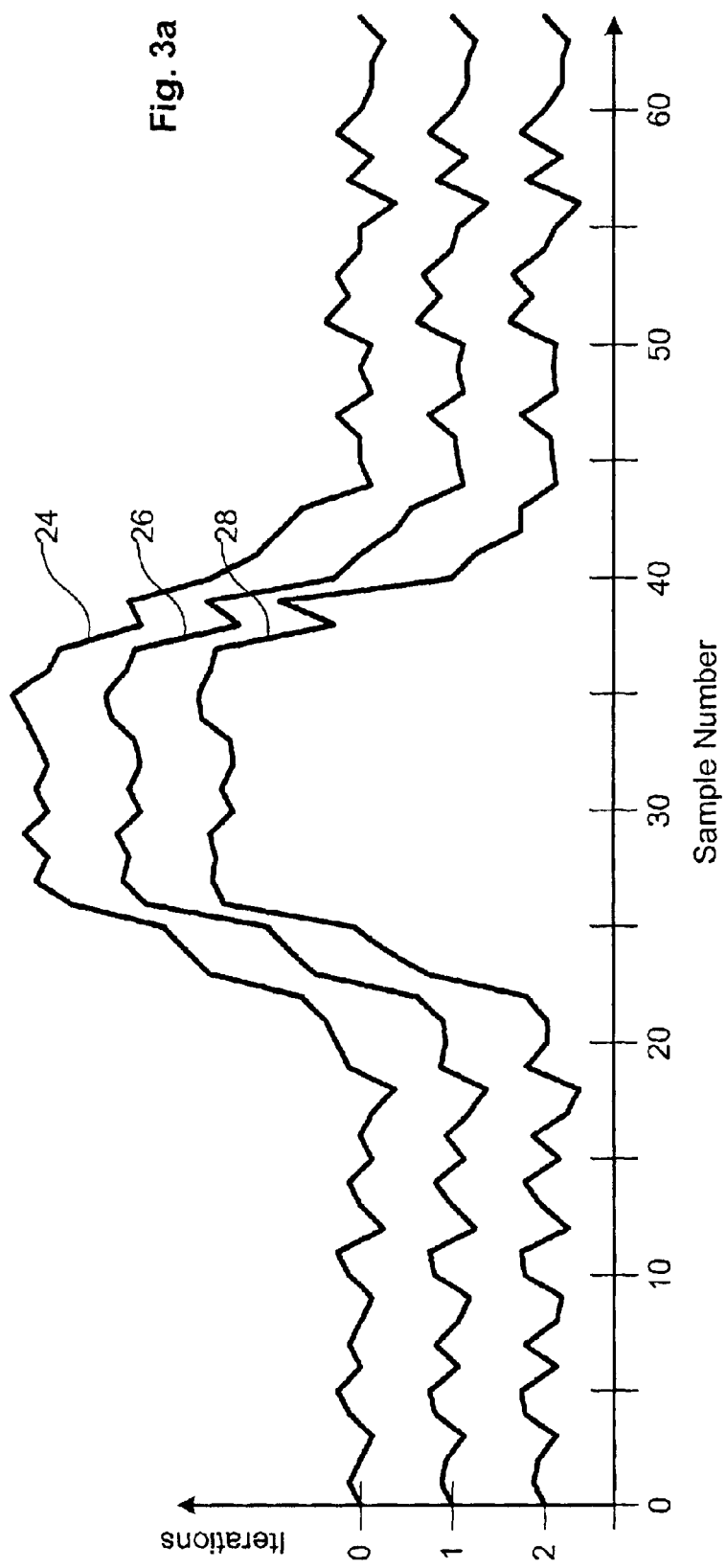

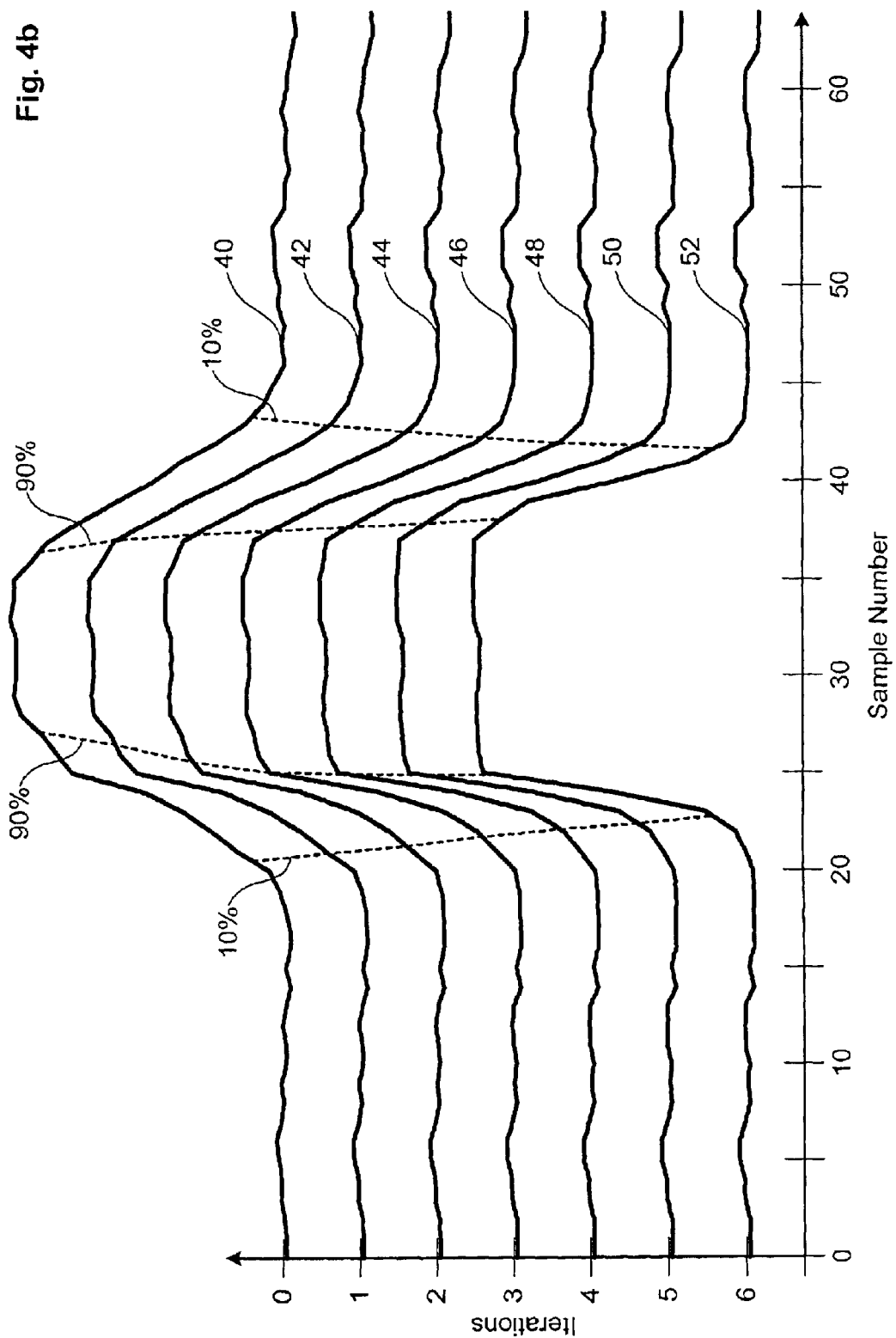

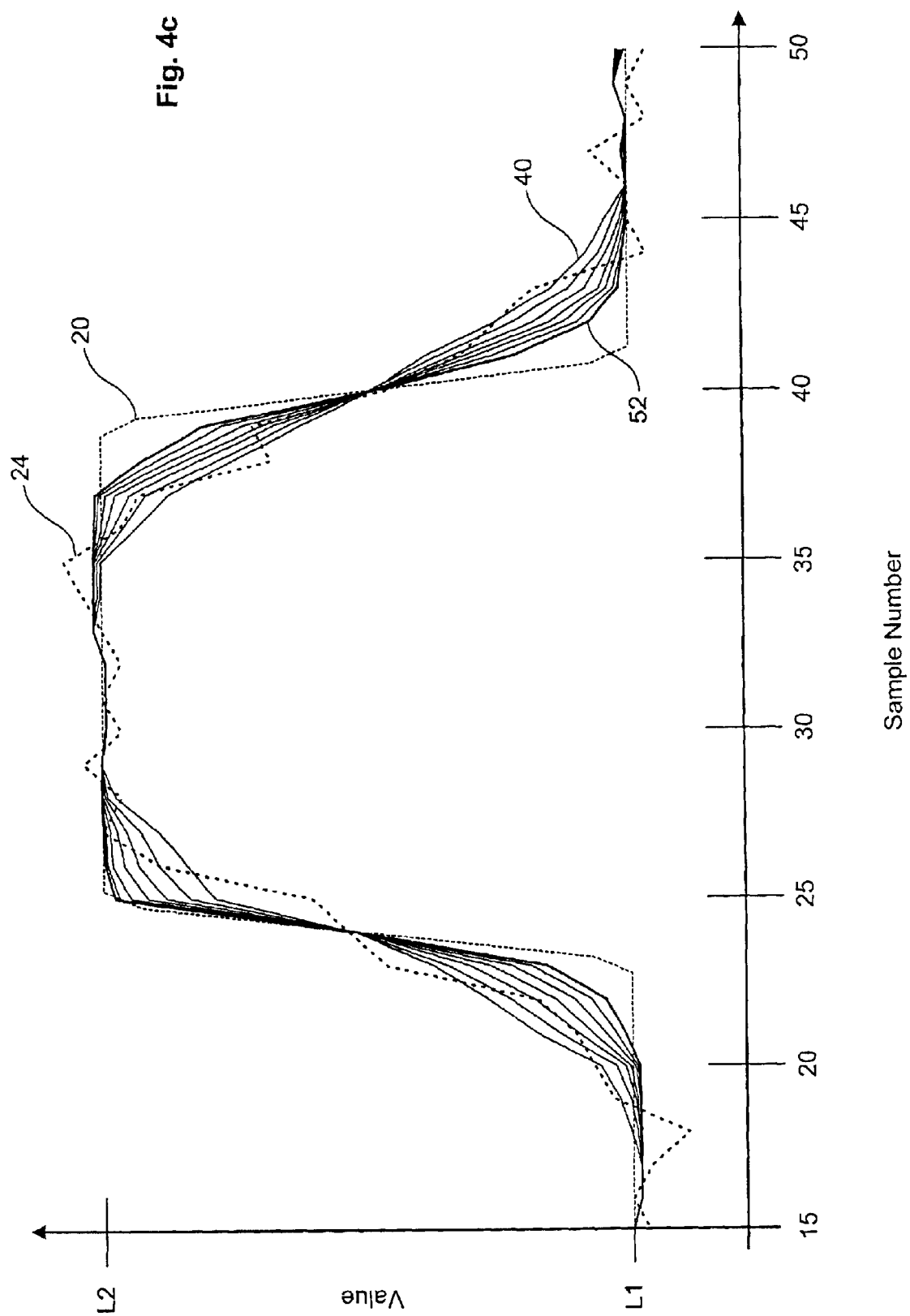

NONLINEAR EDGE-ENHANCEMENT FILTER

FIELD OF THE INVENTION

This present invention relates generally to digital data filtering, and more particularly to non-linear filtering for enhancing data edge features.

BACKGROUND OF THE INVENTION

Digital images represent visual information as a spatial array of sampled intensity, color, or other spectral information. Sampling is typically done on a regular grid, such as a hexagonal grid pattern, or most commonly, a rectangular or square grid pattern. To avoid creating digital aliasing artifacts, the sampling must obey the Nyquist criterion, i.e., the image is typically blurred or filtered prior to sampling such that the highest spatial frequencies present complete no more than one cycle for every two samples.

For various reasons, a digital image may be blurred to a much larger extent than that required by Nyquist. The optics that focused the image may be imperfect or out of focus, or the subject or optics may have moved during sampling. The image may be band-limited due to lossy compression, or filtered to reduce transmission bandwidth. In such cases, it may be desirable to run an edge-sharpening filter to "restore" lost high-frequency content prior to image display. In other cases, an edge-sharpening filter could be used simply to create an aesthetically pleasing effect on an otherwise focused and full-bandwidth image.

Many researchers have proposed methods for sharpening image edges. Linear filtering methods include unsharp masking, which creates a derivative image of high-spatial frequency regions on an image, and then adds the derivative image to the original. Such methods are discussed in G. Ramponi and A. Polesel, "A Rational Unsharp Masking Technique", Journal of Electronic Imaging, vol. 7, no. 2, Apr. 1998, pp. 333–38. Unfortunately, like real edges, noise also has high-spatial frequency, and thus unsharp masking tends to enhance image noise. Unsharp masking can also produce overshoot and undershoot near image edges.

Deblurring can also be done using deconvolution filtering. Such methods attempt to invert the blurring process by processing the image with an inverse estimate of the blurring function. Such solutions are also susceptible to noise, and can have stability problems.

Other researchers have proposed non-linear methods for sharpening image edges. One such approach is "shock filters", as described in U.S. Pat. No. 5,644,513, "System Incorporating Feature-Oriented Signal Enhancement Using Shock Filters", issued to L. Rudin and S. Osher. The shock filter is an iterative "diffusion" process that uses partial differential equations and relies on locating the image edge nearest each pixel, and that edge's orientation. Once that edge is identified, the pixel is adjusted to be more like its neighbor or neighbors that are further away from the edge. Through successive iterations, image edges become sharper as more pixels become like the pixels away from the edges. Because this method relies on locating edges, e.g., through locating zero-crossing points in a second derivative image, its success is also limited by noise that can fool an edge detector, as well as by the effectiveness of the edge detector in locating actual edges. Further, numerical stability must be balanced against convergence speed, and it may be difficult to determine how many iterations should be performed.

SUMMARY OF THE INVENTION

The present disclosure provides a new approach to non-linear diffusion filters. Instead of relying on gradient operators to estimate edge locations, the disclosed approach uses filtering based on local minima and maxima. It is believed that the disclosed min/max approach is often superior to a gradient-based filter, in that it is less sensitive to noise, can converge quickly, and is computationally simple. The proposed methods can robustly sharpen edges without introducing new artifacts, and are conceptually and practically straightforward to implement.

In one aspect of the present invention, a method of processing a digital data array is disclosed. The method comprises locating maximum and minimum sample values within a local window, in the array, containing a sample to be diffused. An edge deflection value between the maximum and minimum values is defined. When the sample has a value lower than the edge deflection value, a negative diffusion quantity is calculated, based on the position of the sample value between the minimum and the edge deflection value. When the sample has a value greater than the edge deflection value, a positive diffusion quantity is calculated, based on the position of the sample value between the edge deflection value and the maximum. In either case, the diffusion quantity is added to the value of the sample of interest to form a diffused sample value.

In another aspect of the invention, an article of manufacture is disclosed. The article of manufacture comprises a computer-readable medium containing executable or interpretable instructions for a processor that, when executed, cause the processor to perform the method detailed above.

In another aspect of the invention, an apparatus for processing a digital data array is disclosed. The apparatus has means for identifying the maximum and minimum sample values occurring within a supplied window of the array, the window also containing the sample to be diffused. The apparatus also has means for selecting an edge deflection value having a value between the maximum and minimum pixel values. The apparatus further comprises means for calculating a diffusion quantity based on the sample to be diffused, the maximum, the minimum, and the edge deflection values. Finally, circuitry is included for adding the diffusion quantity to the sample to be diffused.

BRIEF DESCRIPTION OF THE DRAWING

The invention may be best understood by reading the disclosure with reference to the drawing, wherein:

FIG. 1c illustrates the blurred pulse of FIG. 1b with additive noise;

FIG. 1d overlays the pulses of FIGS. 1a–1c;

FIG. 2 locates, on a graph, various points used to calculate a diffused sample value for a sample in a digital data array;

FIG. 3a shows the pulse of FIG. 1c, along with two diffused versions of the pulse formed according to an embodiment of the invention;

FIG. 4b shows the low-pass-filtered pulse of FIG. 4a, along with six diffused versions of the pulse formed according to an embodiment of the invention;

FIG. 4c shows an enlarged section of the curves of FIG. 4b, overlaid for comparison;

DETAILED DESCRIPTION OF THE EMBODIMENTS

The following examples rely heavily on one-dimensional digital data arrays, such as might be obtained by temporally sampling the output of a sensor. Such examples are easily comprehended and are presented for ease of description. Nevertheless, those skilled in the art will recognize that the present invention has application for a general n-dimensional array, regardless of the source of the data in the array. Particular embodiments of the present invention have been demonstrated to work well on two-dimensional data arrays such as grayscale and color images.

Figure 1A:
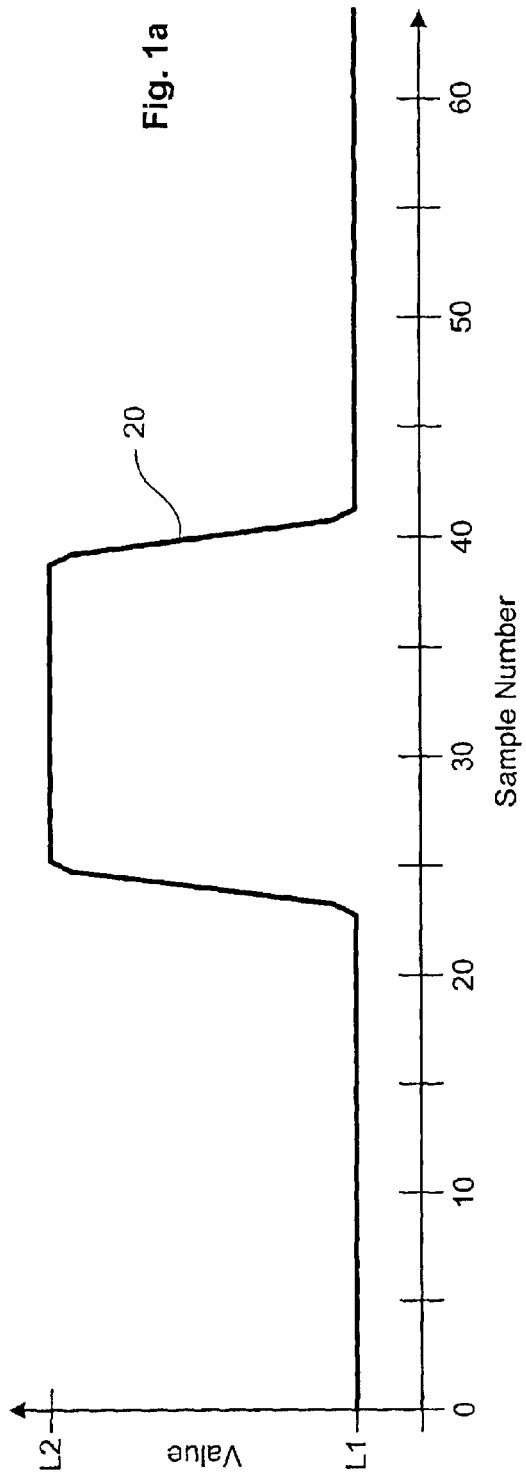
FIG. 1a illustrates a digitally sampled rectangular pulse.
Figure 1B:
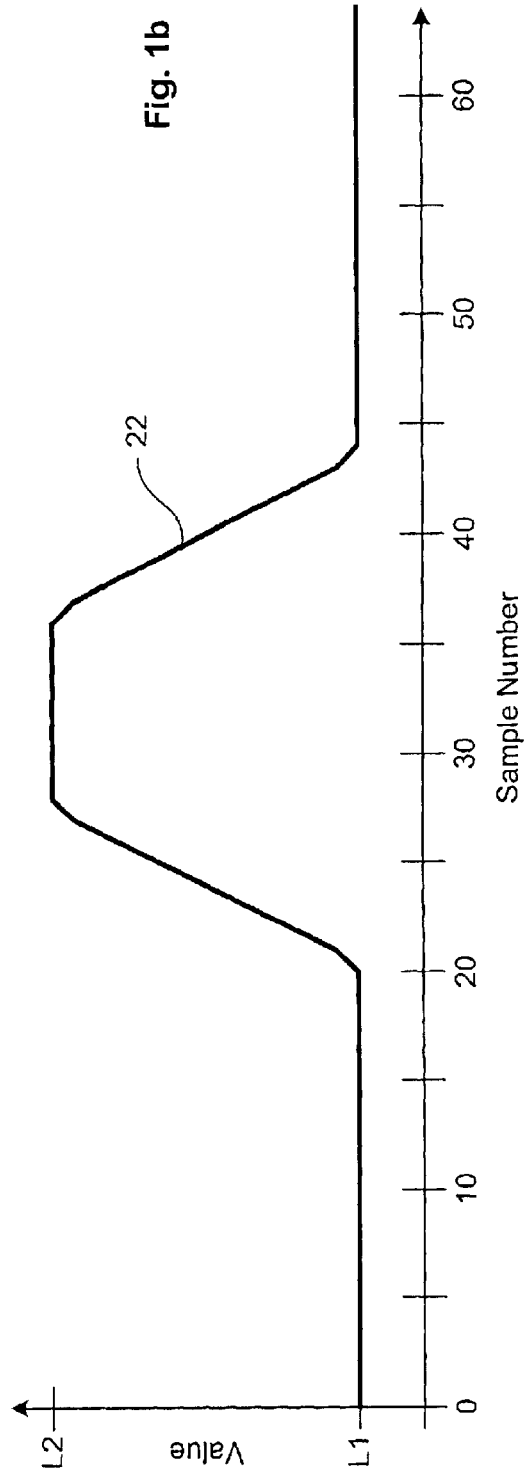
FIG. 1b illustrates the pulse of FIG. 1 after blurring.

Referring first to FIGS. 1a and 1b, a one-dimensional digitally sampled rectangular pulse is illustrated, with the leading pulse edge centered at sample 24 and the trailing pulse edge centered at sample 40. Each pulse has a minimum value L1 and a maximum value L2. The difference between the two figures is the sharpness of the pulse edges. For a one-dimensional signal s(x), a positive step edge can be characterized by the equation $$s(x; b, c, ed, t) = b + \frac{c}{2}(1 + \text{erf}((x-ed)/\sqrt{2t})),$$

where b corresponds to L1 in FIGS. 1a and 1b,c is a contrast corresponding to L2−L1, ed is the center of the edge (the second derivative zero-crossing, a value of 24 in the Figures), and t is a scale parameter controlling the sharpness of the edge. FIG. 1a shows sharp step edges, with t approximately 1 for pulse 20, and FIG. 1b shows blurred step edges with t approximately 8 for pulse 22.

One use of a filter such as described herein is to recover pulse 20 from a blurred version, e.g., pulse 22. This may further be complicated by the presence of noise in the sampled data, as illustrated in FIG. 1c. Pulse 24 illustrates pulse 22 corrupted with additive, non-band-limited noise, which produces a series of "false" edges in the data. FIG. 1d overlays pulses 20, 22, and 24 for comparison.

A preferred approach disclosed herein is to attempt to recover, e.g., pulse 20 from pulse 22 or pulse 24, by a recursive process. At each step, this process approximates the recovery of s(x; b, c, ed, t) from s(x; b, c, ed, 2t). The following description refers to FIG. 2.

FIG. 2 shows a section of a one-dimensional data array 30, from sample 32 to sample 40. Over this sample range, data array 30 drops smoothly from a local region with a constant value of 19 into a local region with a gradient of constant slope 4/sample. A non-linear filter according to an embodiment of the invention produces the diffused array represented by curve 32 according to the following calculations.

A window W is defined for each sample to be diffused. In FIG. 2, W is centered on the current pixel of interest s (sample number 36), and has a width of seven samples.

Within the local window, the maximum and minimum sample values, max and min, are located. For W as shown in FIG. 2, max=19 using either sample 33 or sample 34, and min=5 at sample 39.

Using the max and min for the current window, a midpoint, or more generally, an edge deflection value ed is defined. Where ed is a midpoint, it can be calculated as (max+min)/2. In FIG. 2, the current value of ed is calculated at 12. The value of the current sample s (in this example s=16) is compared to ed. When s has a value lower than ed, a diffusion quantity d is calculated using the equation:

$$d = \frac{(s - \min)(s - ed)}{\max - \min}.$$

Otherwise, as in the illustrated case, d is calculated using the equation:

$$d = \frac{(\max - s)(s - ed)}{\max - \min}.$$

Using the example values, d=0.86.

An adjusted sample s' is formed by adding d to s, e.g., s'=16.86 for the example of FIG. 3.

Given this simple example and the equations above, several observations can be made. First, the edge represented in data 30 is definitely enhanced, as illustrated in data 32. Second, the max and min within each local window are unchanged during an iteration, that is, if the current sample is a local maximum or minimum it will not be adjusted. Likewise, if the current sample is exactly midway between the local max and min (that is, s=ed), it will not be adjusted (thus samples in the interior of constant gradient local regions will not be appreciably changed in a given iteration, see sample 40 in FIG. 2). If a sample is between max and ed, it will be adjusted toward max, with a maximum adjustment if the sample is exactly halfway between max and ed. If a sample is between ed and min, it will be adjusted toward min, with a maximum adjustment if the sample is exactly halfway between ed and min. Finally, the gain of the adjustment is scaled by the local contrast, max−min, such that small adjustments are made on small edges, large adjustments are made in large edges, and edge sharpening converges similarly for all.

There are other ways to view the equations presented above. For instance, an adaptive gain a can be defined, using a deviation from the midpoint, dev=s−ed, and the local contrast c=max−min, as:

$$a = \frac{1}{2} - \left| \frac{|dev|}{c} - \frac{1}{2} \right|.$$

The adjusted sample value s' is then calculated with a first order exponential filter-based on the distance from s to the nearest local extrema, using the adaptive gain a:

s'=s+a(max−s) dev>0 s'=s+a(min−s) dev<0

This approach has several advantages over prior art edge enhancement techniques. It is straightforward to generalize it to n dimensions, since "gradient calculations" only involve location of two local extrema, max and min. No estimation of edge orientation is required. The technique is also numerically stable (in the degenerate no-contrast case where max=min, no adjustment is necessary; in all other cases, the result is bounded). No new local extrema are produced. Further, convergence speed is quite fast, generally reaching a scale $t_2$ from an original scale $t_1$ in $\log_2$ $$\left(\frac{t_2}{t_1}\right)$$

iterations.

Figure 3B:
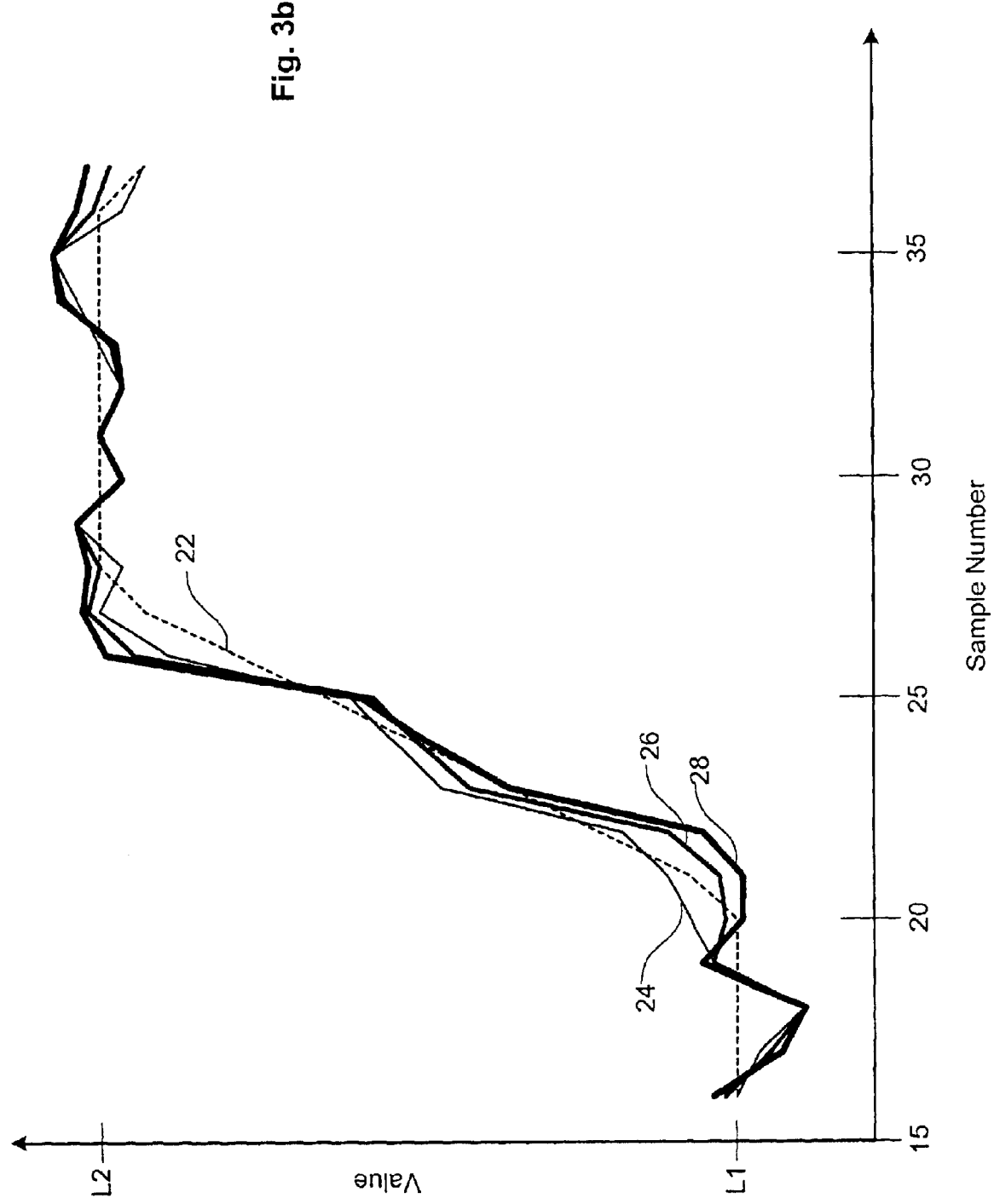
FIG. 3b shows an enlarged section of the curves of FIG. 3a, overlaid for comparison.

Several examples will now be presented. FIG. 3a shows two iterations on the noisy blurred sample data 24 using a window W of seven samples, producing respective data curves 26 and 28. FIG. 3b shows a magnified section of FIG. 3a, with data from curves 24, 26, and 28 overlaid on a dashed curve from the original blurred data 22. Between samples 20 and 30, curve 28 shows a substantially straighter and steeper edge than either the original noisy or the uncorrupted blurred data.

Because the noise in curve 24 was not band-limited, some interesting side effects are present. At samples 38 and 39, a noise spike actually reversed the gradient on the falling edge of the rectangular pulse. This reversal was at least initially processed as an edge to be enhanced, and can be seen growing larger in curves 26 and 28. In further iterations, not shown, the false edge would in this case diminish and finally be absorbed, but would require additional iterations after other, true edges had converged. To avoid such anomalies, one embodiment of the invention performs an intentional pre-blurring step to remove high-frequency noise, ringing, half-toning, dithering, etc. found in some data sources.

Figure 4A:
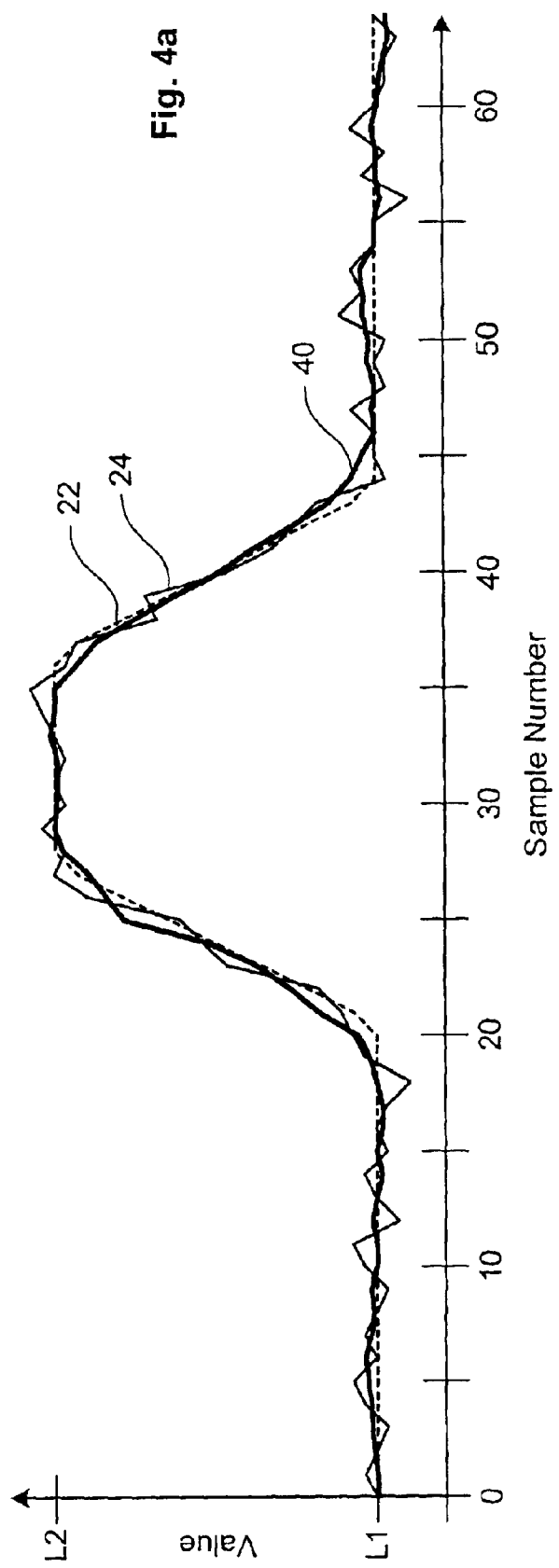
FIG. 4a plots a low-pass-filtered version of the noisy pulse of FIG. 1c, overlaid on the blurred pulse of FIG. 1b.

FIGS. 4a–4c show the results of applying an embodiment of the invention with a pre-blurring step. In FIG. 4a, the original blurred data 22 and noisy blurred data 24 are overlaid. Also overlaid is a data curve 40, generated by convolving noisy blurred data 24 with a simple width-five boxcar filter. The boxcar filter filters the high-frequency noise considerably, but at the same time results in additional pulse spreading in the real pulse, particularly evident by comparing curves 22 and 40 at about samples 20, 37, and 44.

Six iterations of the inverse diffusion process, applied recursively to pre-blurred curve 40, are shown respectively in FIGS. 4b and 4c as curves 42, 44, 46, 48, 50, and 52. FIG. 4b includes contour lines at the 10% and 90% of full contrast points, illustrating the rate of convergence towards a square pulse at the true edge locations (samples 24 and 40). One edge, at sample 25, has essentially converged after six iterations, and the others are close, perhaps two to three iterations away from convergence. FIG. 4c shows a magnified section of the same curves, overlaid with each other and with the original sharp pulse 20.

Embodiments of the present invention are amenable to implementation in either hardware or software. Software implementations can include executable or interpretable code for configuring a microprocessor, a digital signal processor, or other programmable digital device, including multi-processor devices, to perform inverse diffusion methods according to the present invention. The software itself may be embodied in any article of manufacture comprising a computer-readable medium, such as magnetic, optical, electrical, or semiconductor storage media, which may be integrated with or connected to the processor through a bus, or reachable through a network connection.

Figure 5:
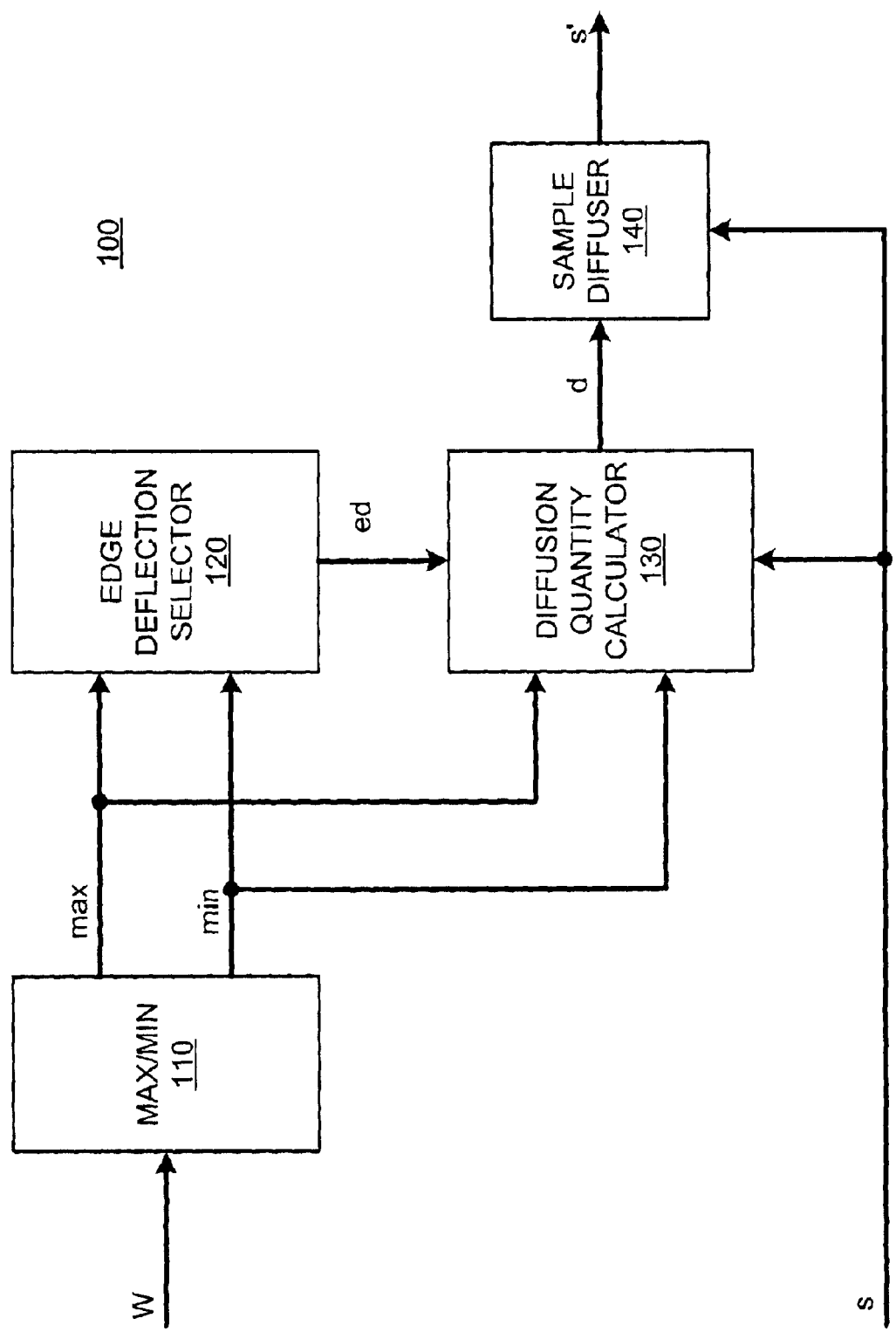
FIG. 5 contains a block diagram for an apparatus that operates according to an embodiment of the invention.

FIG. 5 shows a block diagram for a hardware implementation 100. A sample s and samples from a local window W containing s are supplied to device 100. Samples from W pass to Max/Min locator 110, which can, e.g., sort samples, compare samples sequentially to a first max and min and use the comparison to update max and min, or use a multi-stage parallel comparator to arrive at output values max and min for window W.

Outputs max and min pass to edge deflection selector 120, which generates an edge deflection value ed accordingly. If ed is defined as the midpoint between max and min, and the system uses binary integer input, selector 120 can be constructed from an adder and a shifter; the adder adds max and min, and the shifter takes the adder output and shifts it one bit right to form ed.

Outputs max and min also pass to diffusion quantity calculator 130, along with ed and s. Calculator 130 produces diffusion quantity d, e.g., using adders, multipliers, and/or dividers to perform the equivalent of the equations disclosed in the examples above for d (in some embodiments, lookup tables could avoid at least some computations). Sample diffuser 140 adds d to s to produce diffused output sample s'.

Figure 6:
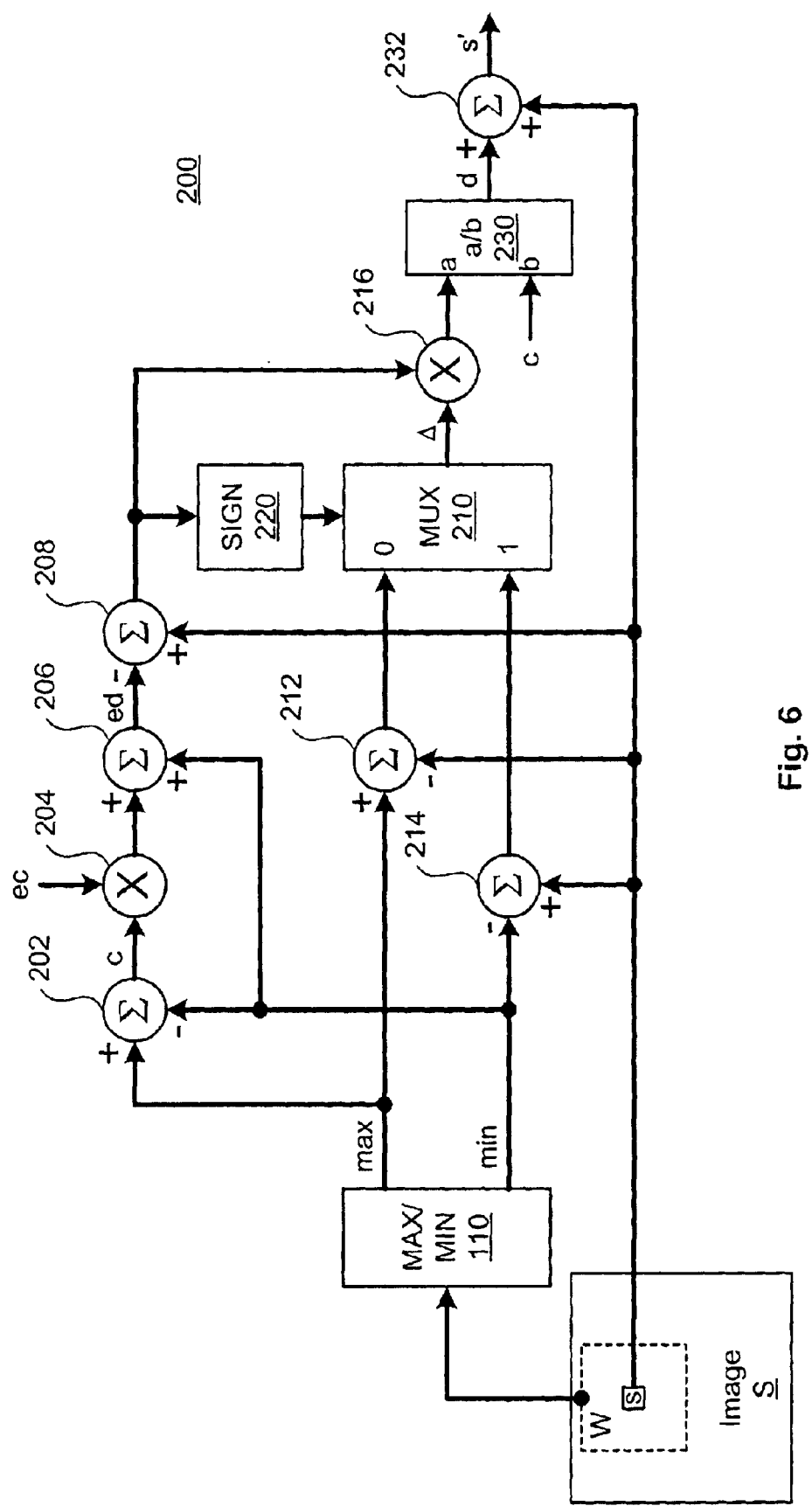
FIG. 6 contains a more-detailed block diagram for an apparatus that operates according to an embodiment of the invention.

FIG. 6 shows another block diagram, for a device 200 operating on an input image S. A pixel s and a local window W surrounding that pixel are extracted from image S and passed to device 200. Max/Min locator 110 operates as in the last embodiment. A contrast value c is calculated by adder 202, which subtracts min from max. Multiplier 204 combines contrast c and a programmable edge constant, ec, (set to 0.5 if the midpoint is selected as ed), and adder 206 adds this result and min to form the edge deflection value ed. Adder 208 subtracts ed from s, forming a signal with a sign bit that indicates whether s is above or below ed.

The output of adder 208 forms an input to sign unit 220, which produces a 0 output if the sign bit of its input is 0 and a 1 if the sign bit of its input is 1. The output of sign unit 220 is supplied as the address bit to 2:1 multiplexer 210. Input 0 of multiplexer 210 is the output of adder 212, which subtracts s from max. Input 1 of multiplexer 210 is the output of adder 214, which subtracts min from s. Multiplexer 210 selects as its output Δ either the value of input 0, if the supplied address is 0, or the value of input 1, if the supplied address is 1.

Multiplier 216 combines the output of adder 208 with Δ, supplying this result to input a of a/b (divide) circuit 230. Input b of divide circuit 230 receives contrast c from adder 202. Divide circuit 230 divides input a by input b, producing diffusion quantity d. Finally, adder 232 adds d and s to produce diffused pixel s'.

Preferably, device 200, or a device supplying inputs to device 200, contains a sequencer that can step through all M rows and N columns of image S, by stepping through all combinations of i and j, $0 \leq i < M$ and $0 \leq j < N$, and for each combination of i and j: defining s=S(i,j); defining W to include all samples S(k,l) for which $i-w \leq k \leq i+w$ and $j-w \leq l \leq j+w$, subject to k and l addressing a valid row and column of S, where w is a constant defining the half-window size (typical values are 1, 2, or 3); and at each step, passing the resultant s and W values to the core of device 200 shown. At the output of device 200, a second corresponding image S' is formed using the values s', such that S'(i,j)=s'.

Figure 7:
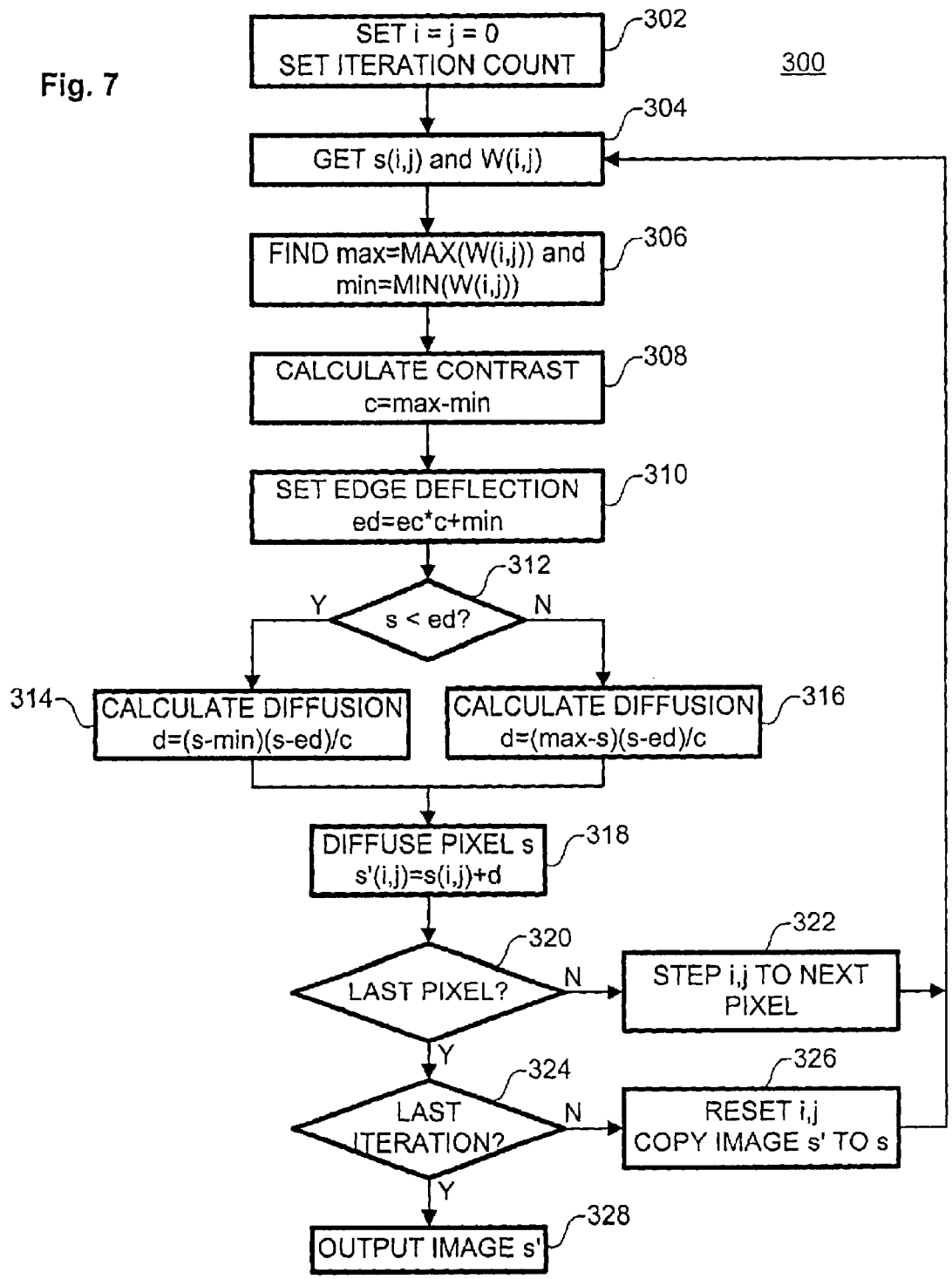
FIG. 7 contains a flowchart for an image enhancement method according to an embodiment of the invention.

FIG. 7 contains a flowchart 300 for recursing on an image using an inverse diffusion process according to an embodiment of the invention. The illustrated steps are amenable to either hardware or software implementation. In general, once the last pixel of the image has been diffused (decision block 320), an iteration counter is incremented (or decremented). If the last iteration has been reached, decision block 324 transfers image s' to output; otherwise, the pixel indices i,j are reset, image s' is copied to image s, and the diffusion process is restarted. Note that image transfer need not require overwriting; memory pointers may merely be reset such that s points to the start of s' generated during the last iteration, and s' points to a new location.

Where each sample point has a multidimensional component, such as with color imagery, many approaches are possible. Each component image can be diffused separately. In the alternative, a magnitude component image, such as a two-norm or infinity-norm, can be calculated, and then diffused to produce a scale factor to be used for scaling each component.

Embodiments of the invention have been tested with various types of imagery, including digitally sampled graphics, text, and natural scenes. Of particular interest is imagery that has been degraded, e.g., received grayscale or color facsimiles, half-toned or dithered images, images that have been compressed with a lossy compressor such as a JPEG compressor, etc. Such imagery will usually include visible blurring and/or compression artifacts (JPEG compression is notorious for producing ringing artifacts near edges). To avoid enhancing ringing artifacts, a preferred approach is to reduce ringing, e.g., using a Perona-Malic nonlinear anisotropic de-ring filter or other suitable de-ring/lowpass filter, prior to applying the inverse diffusion filter to the data. The inverse diffusion filter is then applied to the image for a selected number of recursions to achieve the desired image-sharpening effect. For several test images, the Perona-Malic filter was able to remove ringing artifacts, at the expense of edge crispness. Three iterations of the primary disclosed embodiment filter, with ed set to the midpoint between min and max and a seven-by-seven-pixel window, followed and greatly improved visual quality.

The rate and characteristics of convergence for the described embodiments can be modified by changing the gain, or even the diffusion function. The gain can be changed by merely adding a scale factor $\alpha$ to the diffusion quantity equations:

$$d = \alpha \frac{(\max - s)(s - ed)}{\max - \min} \quad s < ed$$

$$d = \alpha \frac{(s - \min)(s - ed)}{\max - \min} \quad s > ed$$

Different effects can also be realized by selecting an edge deflection value that is not midway between min and max. The equation for ed can be generalized to the following form $ed = \min + ec(\max - \min)$, where $0 < ec < 1$.

When the edge constant ec=0.5, this equation reduces to a midpoint equation. When ec=1, this equation reduces to ed=max, and all edges sharpen without moving samples towards the local maxima (all diffusion is towards the local minima). When ec=0, this equation reduces to ed=min, and all edges sharpen without moving samples towards the local minima (all diffusion is towards the local maxima). Where the input is blurred text and black values are defined lower than white values, for example, ec=0 would sharpen and thin blurred text, and ec=1 would sharpen and thicken blurred text. Various intermediate effects could be achieved with other values of ec.

The function used to calculate diffusion quantity could also be modified. For instance, d could be defined using a sine function:

$$d = \frac{\alpha}{c} \sin\left(2\pi \frac{\max - s}{c}\right)$$

Although ed does not appear explicitly in this equation, it is implicitly defined at the midpoint since the equation has collapsed to a single form. Similar sets of two sinusoidal equations could be developed for other values of ed. Another choice for calculating diffusion quantity uses the error function $$\operatorname{erf} x = \frac{2}{\sqrt{\pi}} \int_0^x e^{-t^2} dt$$

and its inverse inverf x. Using these functions, the diffusion quantity can be expressed as $d = [(s-ed)/c - \operatorname{erf}(2* \operatorname{inverf}((s-ed)/c))]*c/2$ $$d = \frac{c}{2}\left[\frac{(s-ed)}{c} - \operatorname{erf}\left(2\operatorname{inverf}\left(\frac{(s-ed)}{c}\right)\right)\right].$$

The complexity of such an approach can be reduced in some embodiments by using lookup tables for the complex function values.

Another area in which computational burden can be lowered, at least for multi-dimensional data, is the identification of local maxima and minima. For instance in a two-dimensional data array, a min/max search of a W×W window has a complexity on the order of $W^2$. If memory is available to store an intermediate data array, a first pass can calculate min and max values on a 1×W window and store those min and max values at an intermediate-data-array location corresponding to the center of that window. A second min/max search, on a W×1 window in the intermediate-data-array, produces the same min and max that would be found on a one-pass search of the entire W×W array. Thus the complexity of the two-pass approach is on the order of 2W instead of $W^2$.

Various other modifications to the described embodiments are possible. Other effects may be achievable using irregular window shapes, such as those that are not symmetric about the sample of interest, or provide directionality by including more samples along a selected axis. Near a data boundary, the window can shrink, samples can be mirrored, or diffusion operations may simply not be performed. The diffusion value can be quantized such that for small local contrast values, the diffusion quantity rounds to zero; this tends to inhibit changes in the image except near significant edges. Many other optimizations for min/max searching, particularly where many samples from a first min/max search reappear in an overlapping second min/max search, are known to those of skill in the art. Likewise, the hardware and programmable approaches disclosed herein can be arranged in many functionally equivalent arrangements. Such design considerations will be readily apparent to those of skill in the art upon reading this application, and are intended to fall within the scope of the claims.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

What is claimed is:

1. A method of processing a digital data array S, the method comprising:

locating maximum and minimum sample values, max and min, within a local window W of S, the window containing a sample s;

defining an edge deflection value ed having a value between max and min, inclusive;

when s has a value lower than ed, calculating a negative diffusion quantity d based on the position of the value for s between ed and min;

when s has a value greater than ed, calculating a positive diffusion quantity d based on the position of the value for s between ed and max; and forming an adjusted sample s' by adding d to s.

2. The method of claim 1, wherein:
the negative diffusion quantity d is calculated as $$d = \alpha \frac{(s - \min)(s - ed)}{\max - \min}; \text{ and}$$

the positive diffusion quantity d is calculated as $$d = \alpha \frac{(\max - s)(s - ed)}{\max - \min}$$

3. The method of claim 2, wherein $\alpha=1$.

4. The method of claim 2, wherein defining ed comprises setting $$ed = \min + ec(\max - \min), \text{ where } 0 < ec < 1.$$

5. The method of claim 4, wherein $c=0.5$.

6. The method of claim 1, wherein the digital data array S is a two-dimensional image, further comprising forming a filtered image S' from an original image S having M rows and N columns, by stepping through all combinations of i and j, $0 \leq i < M$ and $0 \leq j < N$, and for each combination of i and j:
defining $s = S(i,j)$;
defining W to include all samples $S(k,l)$ for which $i-w \leq k \leq i+w$ and $j-w \leq l \leq j+w$, subject to k and l addressing a valid row and column of S;
completing the steps of claim 1 to arrive at an s' for s and W; and
setting $S'(i,j) = s'$.

7. The method of claim 6, wherein w is selected as a constant for all values of i and j, and wherein w is selected from the group of integers consisting of 1, 2, and 3.

8. The method of claim 6, further comprising selecting a number of iterations K, K>1, and for each iteration:
performing the steps of claim 6 on S to form an image S'; and
setting $S = S'$.

9. The method of claim 6, further comprising blurring S prior to performing the steps of claim 6.

10. The method of claim 9, wherein blurring S comprises filtering S using a Perona-Malic de-ring filter.

11. An apparatus for processing a digital data array, comprising:
means for identifying the maximum and minimum sample values, max and min, occurring within a supplied window of the data array, the supplied window including a sample s;
means for selecting an edge deflection value ed having a value between max and min, inclusive;
means for calculating a diffusion quantity d, based on the position of the value for s between ed and min when s has a value lower than ed, and based on the position of the value for s between ed and max when s has a value greater than ed; and
means for calculating an adjusted sample s' representing d+s.

12. The apparatus of claim 11, wherein the means for selecting an edge deflection value ed comprises digital circuitry for calculating a quantity $$ed = \min + ec(\max - \min), \text{ where } 0 < ec < 1.$$

13. The apparatus of claim 12, wherein the digital circuitry comprises an adder for calculating max+min as a binary value, and a shifter connected to the adder output to shift the adder output one bit right.

14. The apparatus of claim 11, wherein the means for calculating a diffusion quantity d comprises:
a first adder to calculate s−ed;
a second adder to calculate max−s;
a third adder to calculate s−min;
a 2:1 multiplexer to select as its output either the output of the second or the third adder, based on the sign of the output of the first adder;
a multiplier to multiply the output of the multiplexer by the output of the first adder; and
a scaler to scale the output of the multiplier to a value d.

15. The apparatus of claim 14, wherein the scaler divides the output of the multiplier by the value (max−min).

16. An article of manufacture comprising a computer-readable medium containing executable or interpretable instructions for a processor, the instructions, when executed by the processor with input from a digital data array S, performing the steps of:
locating maximum and minimum sample values, max and min, within a local window W of digital data array S, the local window containing a sample s;
defining an edge deflection value ed having a value between max and min, inclusive;
when s has a value lower than ed, calculating a negative diffusion quantity d based on the position of the value for s between ed and min;
when s has a value greater than ed, calculating a positive diffusion quantity d based on the position of the value for s between ed and max; and
forming an adjusted sample s' by adding d to s.

17. The article of manufacture of claim 16, wherein the executable instructions perform the recited steps for each sample s in S.

18. The article of manufacture of claim 17, wherein the executable instructions include instructions for iterating the recited steps on the data array S a selectable number of iterations.

19. The article of manufacture of claim 17, wherein the executable instructions contain instructions for low-pass and/or de-ring filtering S prior to performing the recited steps of claim 17.

* * * * *